US012671928B2

(12) United States Patent
Boyd

(10) Patent No.: US 12,671,928 B2
(45) Date of Patent: Jun. 30, 2026

(54) MICROPHONE CHIP AND MICROPHONE

(71) Applicant: AAC Technologies Pte. Ltd., Singapore (SG)

(72) Inventor: Euan James Boyd, EB (GB)

(73) Assignee: AAC Technologies Pte. Ltd., Singapore (SG)

( * ) Notice: Subject to any disclaimer, the term of this patent is extended or adjusted under 35 U.S.C. 154(b) by 654 days.

(21) Appl. No.: 18/084,584

(22) Filed: Dec. 20, 2022

(65) Prior Publication Data

US 2024/0205578 A1 Jun. 20, 2024

(51) Int. Cl.

| | |
|---|---|
| ***H04R 1/08*** | (2006.01) |
| ***H04R 1/28*** | (2006.01) |
| ***H04R 7/16*** | (2006.01) |
| ***H04R 7/26*** | (2006.01) |

(52) U.S. Cl.

CPC ........... *H04R 1/083* (2013.01); *H04R 1/2869* (2013.01); *H04R 7/16* (2013.01); *H04R 7/26* (2013.01)

(58) Field of Classification Search

CPC ............ H04R 2201/003; H04R 19/005; B81B 3/0045

USPC ........................................ 381/175, 174, 191

See application file for complete search history.

(56) References Cited

FOREIGN PATENT DOCUMENTS

| | | | |
|---|---|---|---|
| CN | 104105041 B | * 1/2019 | |
| CN | 111757223 A | * 10/2020 | H04R 19/005 |

* cited by examiner

*Primary Examiner* — Sunita Joshi

(74) *Attorney, Agent, or Firm* — Wiersch Law Group

(57) ABSTRACT

A microphone chip and a microphone. The microphone chip includes: a base including an inner cavity; a diaphragm including a diaphragm inner part and a diaphragm outer part that are connected to the diaphragm inner part, the diaphragm being supported on the base by means of the diaphragm outer part, and the diaphragm inner part being arranged to be opposite to the inner cavity; and a limiting member supported on the base and located at two opposite sides of the diaphragm along a vibration direction of the diaphragm, the limiting member being spaced apart from the diaphragm, and the limiting member being configured to limit an amplitude of the diaphragm inner part. When the diaphragm inner part moves to a certain displacement, the limiting member can limit further movement of the diaphragm inner part, thereby reducing a damage risk caused by excessive displacement of the diaphragm under high sound pressure.

9 Claims, 3 Drawing Sheets

MICROPHONE CHIP AND MICROPHONE

TECHNICAL FIELD

The present invention relates to the technical field of optical microphones, and particularly, to a microphone chip and a microphone.

BACKGROUND

Conventional microphones are based on capacitors, in which a diaphragm vibrates with sound waves to generate a voltage change when a distance between the capacitor plates is changed, thereby enabling acoustic-electrical conversion.

An optical microphone usually includes: an optoelectronic module, an application-specific integrated circuit (ASIC), and a micro-electromechanical system (MEMS). The optoelectronic module can emit light to the MEMS, and receive light reflected by the MEMS. When sound waves drive the diaphragm of the MEMS, the diaphragm vibrates slightly, thereby changing the intensity and the phase of light reflected back to the optoelectronic module. The optoelectronic module converts the signal of the intensity and the phase of the reflected light into an electrical signal, and transmits the electrical signal to the ASIC, thereby realizing the conversion from a sound signal to an optical signal then to an electrical signal.

When the MEMS is subjected to a signal with a high difference, the diaphragm may be deflected greatly, resulting in extremely high stress to cause damage of the diaphragm.

SUMMARY

The present invention aims to provide a microphone chip and a microphone, which can reduce a risk of damage when the diaphragm has a large vibration displacement.

The present invention provides a microphone chip. The microphone chip includes: a base including an inner cavity; a diaphragm, at least a part of the diaphragm being supported on the base, and at least a part of the diaphragm being arranged to be opposite to the inner cavity; and a limiting member supported on the base and located at two opposite sides of the diaphragm along a vibration direction of the diaphragm, the limiting member being spaced apart from the diaphragm, and the limiting member being configured to limit an amplitude of the diaphragm. In the present invention, when the diaphragm inner part moves to a certain displacement, the limiting member can limit further movement of the diaphragm inner part, so as to reduce a risk of damage caused by excessive vibration displacement of the diaphragm under high sound pressure.

As an improvement, the limiting member includes a first limiting part and a second limiting part that are located at the two opposite sides of the diaphragm along the vibration direction. The first limiting part and the second limiting part each extend along a direction perpendicular to the vibration direction of the diaphragm, and projections of the first limiting part and the second limiting part along the vibration direction of the diaphragm are located at least partially in the inner cavity. Along the vibration direction of the diaphragm, at least a portion of the diaphragm that is arranged to be opposite to the inner cavity is located between the first limiting part and the second limiting part.

As an improvement, the diaphragm comprises a diaphragm inner part and a diaphragm outer part that are connected to the diaphragm inner part, the diaphragm inner part and the diaphragm outer part are separated parts or formed into one piece, the diaphragm is supported on the base by means of the diaphragm outer part, the diaphragm inner part is arranged to be opposite to the inner cavity, and at least a portion of the diaphragm inner part is located between the first limiting part and the second limiting part.

As an improvement, the projections of the first limiting part and the second limiting part towards the diaphragm inner part along the vibration direction of the diaphragm cover only an edge portion of the diaphragm inner part.

As an improvement, during the vibration of the diaphragm, the diaphragm inner part abuts against an edge of the first limiting part and an edge of the second limiting part that are adjacent to the inner cavity, to limit the amplitude of the diaphragm.

As an improvement, the microphone chip further includes a fixing member supported on the base and connected between the first limiting part and the second limiting part. The fixing member connects an edge of the first limiting part and an edge of the second limiting part that are away from the diaphragm inner part, and at least a portion of the diaphragm outer part is fixed to the fixing member.

As an improvement, the fixing member includes a first fixing part and a second fixing part that are stacked along the vibration direction of the diaphragm, and the diaphragm outer part is at least partially sandwiched between the first fixing part and the second fixing part.

As an improvement, rigidity of the diaphragm inner part is greater than rigidity of the diaphragm outer part, the diaphragm outer part is fixed to the fixing member only at an edge away from the diaphragm inner part, and the diaphragm is supported on the base only by means of the diaphragm outer part.

As an improvement, the diaphragm further includes a connection part, and the connection part connects the diaphragm inner part and the diaphragm outer part. Stiffness of the connection part is smaller than stiffness of the diaphragm inner part.

The present invention further provides a microphone, including: the microphone chip described above; an optoelectronic module configured to emit light to the diaphragm along the vibration direction of the diaphragm, and receive light reflected by the diaphragm, so as to convert an optical signal into an electrical signal; and an integrated circuit module configured to receive the electrical signal transmitted by the optoelectronic module. When the diaphragm vibrates under a sound pressure, an intensity and a phase of the light reflected by the diaphragm change, and the integrated circuit module obtains displacement of the diaphragm by analyzing the electrical signal transmitted and received by the optoelectronic module.

REFERENCE NUMERALS

1—microphone chip;
  11—base;
    111—inner cavity;

12—diaphragm;
121—diaphragm inner part;
122—connection part;
123—diaphragm outer part;
13—limiting member;
131—first limiting part;
132—second limiting part;
14—fixing member;
141—first fixing part;
142—second fixing part;
2—optoelectronic module.

DESCRIPTION OF EMBODIMENTS

The present invention will be further described below with reference to the accompanying drawings and embodiments.

Figure 1:
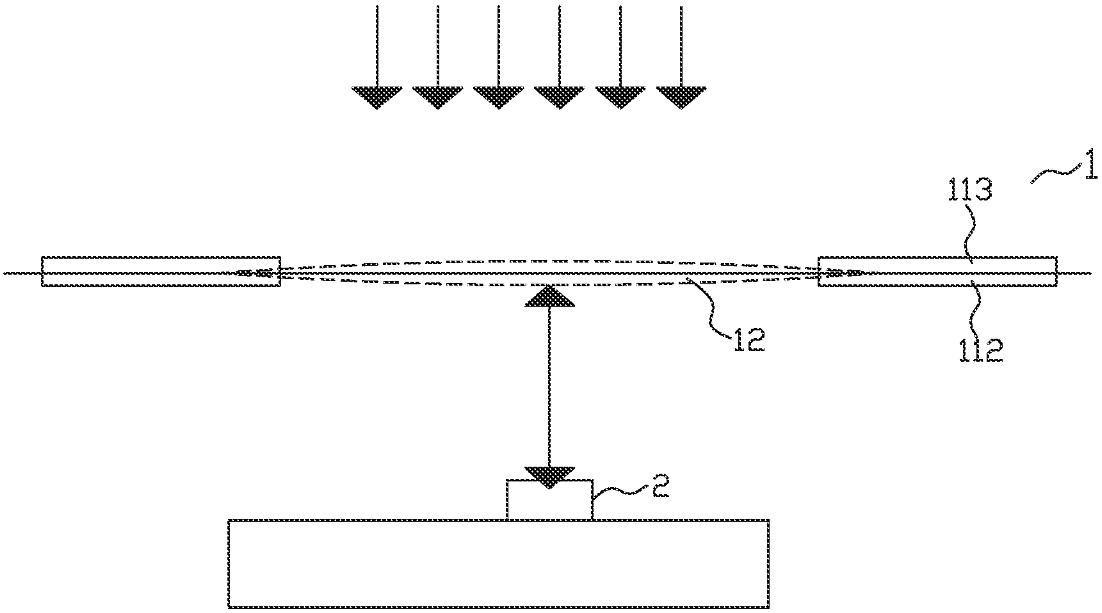
FIG. 1 is a schematic diagram of a microphone in a use state according to an embodiment of the present invention.

An embodiment of the present invention provides a microphone, which may be an optical microphone. As shown in FIG. 1, the microphone includes a microphone chip 1, an optoelectronic module 2 and an integrated circuit module (not shown). The integrated circuit module is electrically connected to the microphone chip 1 and the optical module 2. The microphone chip 1 includes a diaphragm 12, and the diaphragm 12 can vibrate in response to sound pressure. The optoelectronic module 2 can emit light to the diaphragm 12 and receive light reflected by the diaphragm 12, to convert the optical signal into an electrical signal. The integrated circuit module can receive the electrical signal transmitted by the optoelectronic module 2. When the microphone is in a use state, the sound can drive the diaphragm 12 to vibrate, and the optoelectronic module 2 emits light to the diaphragm 12. Due to vibration of the diaphragm 12, the intensity and the phase of light reflected by the diaphragm 12 changes. The optoelectronic module 2 converts the signals of the intensity and the phase of the reflected light into electrical signals, and transmits the electrical signal to the integrated circuit module, thereby realizing the conversion from a sound signal to an optical signal then to an electrical signal. The integrated circuit module obtains the displacement of the diaphragm 12 by analyzing the electrical signals transmitted and received by the optoelectronic module 2.

In an embodiment of the present invention, the optoelectronic module 2 includes a laser device and a sensor such as a light-emitting diode. The laser device and the sensor are arranged at a same side of the diaphragm 12. The laser is configured to emit light to the diaphragm 12, and the sensor is configured to receive light emitted from the laser and reflected by the diaphragm 12. The integrated circuit module includes an electronic circuit, and the electronic circuit constitutes a control or central processing unit and is configured to drive, control and implement necessary actions of the associated electronic and optoelectronic components in the system.

Figure 2:
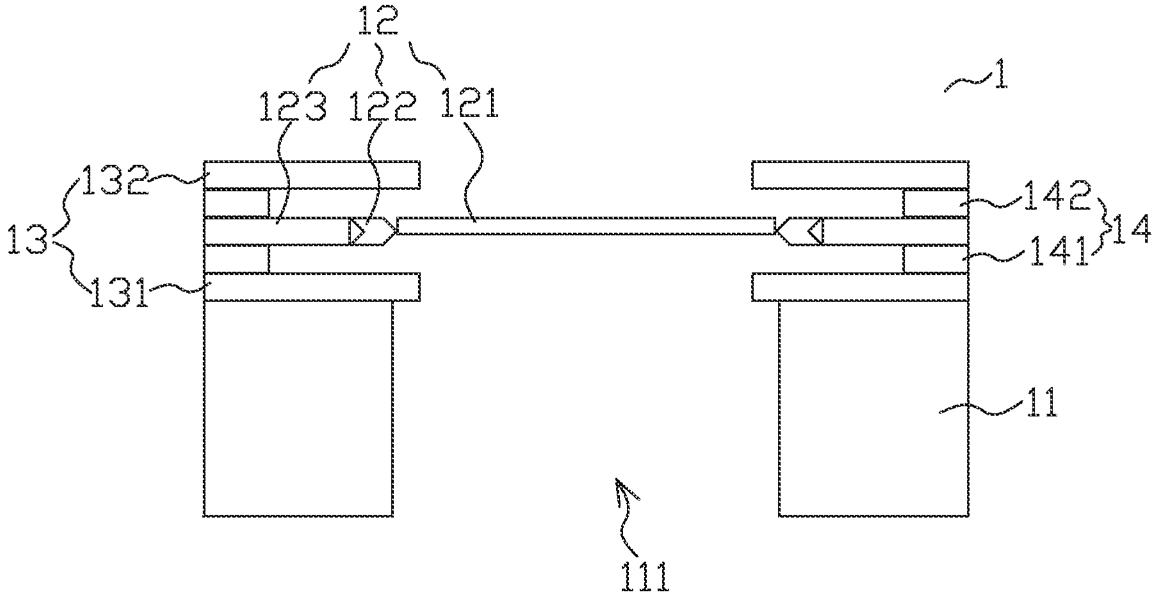
FIG. 2 is a schematic structural diagram of a microphone chip according to an embodiment of the present invention.
Figure 3:
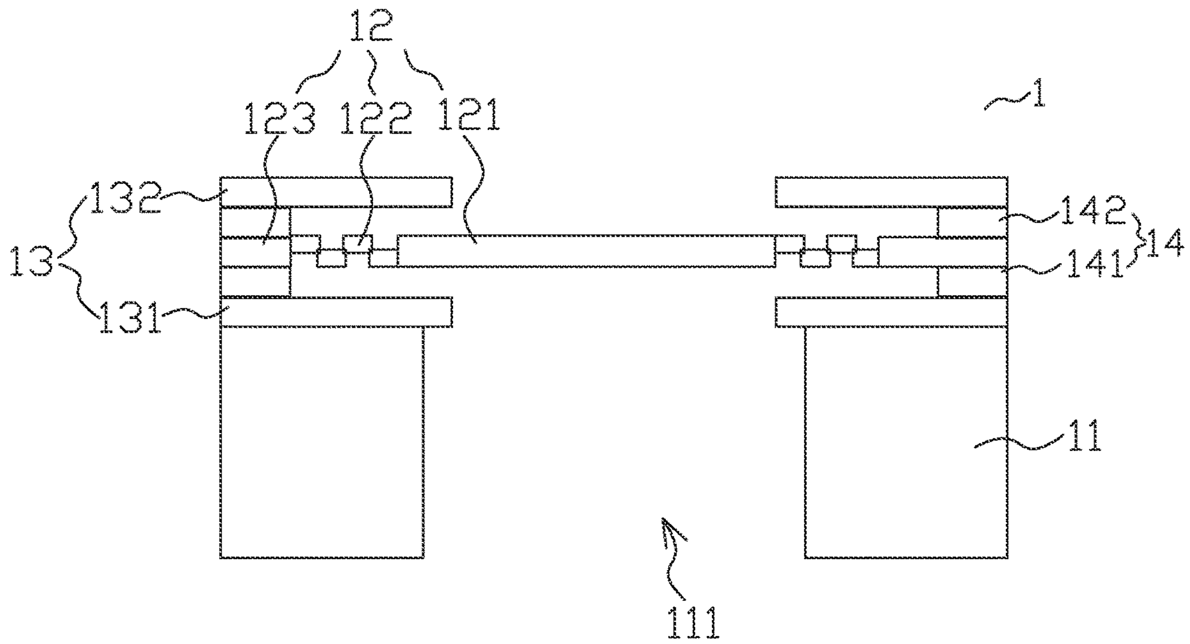
FIG. 3 is a schematic structural diagram of a microphone chip according to another embodiment of the present invention.

In an embodiment of the present invention, as shown in FIG. 2 and FIG. 3, the microphone chip 1 includes a base 11, a diaphragm 12 and a limiting member 13. The diaphragm 12 is supported on the base 11. The diaphragm 12 includes a diaphragm inner part 121 and a diaphragm outer part 123 that are connected to each other. The diaphragm 12 is supported on base 11 by means of the diaphragm outer part 123. The base 11 includes an inner cavity 111, and the diaphragm inner part 121 and the inner cavity 111 are arranged opposite to each other. The limiting member 13 is supported on the base 11, and the limiting member 13 is located at two opposite sides of the diaphragm 12 along a vibration direction and is spaced apart from the diaphragm 12. The limiting member 13 is configured to limit an amplitude of the diaphragm inner part 121.

When the diaphragm 12 moves in response to the sound pressure, a length of the inner cavity 111 changes, the light intensity of the light changes, an angle of the reflected light changes, and a phase of the light changes, and then the light signal corresponding to the sound signal is collected, and then the light signal is converted into an electrical signal for further analysis.

In the present invention, along the vibration direction of the diaphragm 12, the diaphragm 12 is spaced apart from the limiting member 13 that is located at two sides of the diaphragm 12, so that the diaphragm 12 has a certain movement space before the limiting member 13 limits it. When the diaphragm inner part 121 vibrates to a certain displacement, at least part of the diaphragm inner part 121 contacts the limiting member 13, so that the limiting member 13 can limit further movement of the diaphragm inner part 121. In this way, an amplitude of the diaphragm inner part 121 is limited, thereby reducing a risk of damage caused by excessive vibration of the diaphragm 12 under a high sound pressure.

In an embodiment of the present invention, as shown in FIG. 2 and FIG. 3, the limiting member 13 includes a first limiting part 131 and a second limiting part 132 that are located at two opposite sides of the diaphragm 12 along the vibration direction. The first limiting part 131 and the second limiting part 132 each extend along a direction perpendicular to the vibration direction of the diaphragm 12. The projections of the first limiting part 131 and the second limiting part 132 along the vibration direction of the diaphragm 12 are at least partially located in the inner cavity 111. Along the vibration direction of diaphragm 12, the diaphragm inner part 121 is located between the first limiting part 131 and the second limiting part 132. Along the vibration direction of diaphragm 12, the projection of the at least part of the first limiting part 131 and the projection of at least part of the second limiting part 132 are located in the inner cavity 111. The first limiting part 131 and the second limiting part 132 do not extend to a middle portion of diaphragm inner part 121. When the diaphragm inner part 121 moves down to abut against the first limiting part 131, the first limiting part 131 limits further downward movement of the diaphragm inner part 121; and when the diaphragm inner part 121 moves up to abut against the second limiting part 132, the second limiting part 132 limits further upward movement of the diaphragm inner part 121, so as to achieve limiting the amplitude of the diaphragm 12. Moreover, the first limiting part 131 and the second limiting part 132 do not extend to the middle portion of the diaphragm inner part 121, that is, the first limiting part 131 and the second limiting part 132 do not completely cover the diaphragm inner part 121, so that the diaphragm inner part 121 can increase the vibration displacement in response to the pressure load. Compared to a backplane structure in which the diaphragm inner part 121 I completely covered, the technical scheme of the embodiments of the present invention can eliminate associated damping, thereby reducing the noise of the microphone.

In an embodiment of the present invention, the projections of the first limiting part 131 and the second limiting part 132 towards the diaphragm inner part 121 along the vibration direction of the diaphragm 12 only cover an edge portion of the diaphragm inner part 121. An inner edge of the first limiting part 131 and an inner edge of the second limiting part 132 are arranged to be opposite to the edge portion of the diaphragm inner part 121. The innermost edge of the limiting member 13 is in contact with the edge portion of the diaphragm inner part 121 to limit further upward and downward movement of the diaphragm inner part 121, thereby reducing a risk of damage of the diaphragm 12 due to an excessive amplitude.

Further, as shown in FIG. 2 and FIG. 3, there is a distance between the edge portion of the diaphragm inner part 121 and the first limiting part 131 and between the edge portion of the diaphragm inner part 121 and the second limiting part 132, so that the diaphragm inner part 121 contacts the first limiting part 131 and the second limiting part 132 after the diaphragm inner part 121 moves to a certain displacement, thereby ensuring that the diaphragm inner part 121 can have a certain movement space before the diaphragm inner part 121 contacts the first limiting part 131 and the second limiting part 132.

As shown in FIG. 2 and FIG. 3, in some embodiments, the microphone chip 1 further includes a fixing member 14 supported on the base 11 and connected between the first limiting part 131 and the second limiting part 132, and the fixing member 14 connects the edges of the first limiting part 131 and the second limiting part 132 away from the diaphragm inner part 121. At least a portion of the diaphragm outer part 123 is fixed to the fixing member 14. In the embodiments of the present invention, the edge portion of the diaphragm outer part 123 may be fixed between the fixing member 14, to reduce a fixing portion to the diaphragm 12, thereby improving the sensitivity of the diaphragm 12.

The fixing member 14 includes a first fixing part 141 and a second fixing part 142 that are stacked along the vibration direction of the diaphragm 12, and at least a portion of the diaphragm outer part 123 is sandwiched between the first fixing part 141 and the second fixing part 142. In an embodiment of the present invention, the first fixing part 141 is located between the diaphragm outer part 123 and the first limiting part 131, and the second fixing part 142 is located between the diaphragm outer part 123 and the second limiting part 132, so that the support of the first fixing part 141 to the first limiting part 131 forms a distance between the diaphragm inner part 121 and the first limiting part 131, and the support of the second fixing part 142 to the second limiting part 132 forms a distance between the diaphragm inner part 121 and the second limiting part 132. In this way, during the vibration process of the diaphragm 12, the diaphragm inner part 121 has a certain movement space before the diaphragm inner part 121 abuts against the first limiting part 131 and the second limiting part 132, and the diaphragm inner part 121 can vibrate in response to the pressure load.

In some embodiments, the stiffness of the diaphragm inner part 121 is greater than the stiffness of the diaphragm outer part 123, so that the diaphragm 12 has a middle portion with higher stiffness and an outer portion with lower stiffness, therefore, the diaphragm 12 can bear a larger sound pressure load, thereby reducing a risk of the damage of the diaphragm 12. Moreover, the diaphragm inner part 121 has a larger amplitude and higher sensitivity. The diaphragm outer part 123 is fixed to the fixing member 14 only at an edge portion away from the diaphragm inner part 121, and the diaphragm 12 is supported on the base 11 only by means of the diaphragm outer part 123. A minimum length of the diaphragm 12 along the periphery is fixed by means of the fixing member 14, so that the vibration displacement of the diaphragm inner part 121 is increased, thereby increasing the mechanical sensitivity of the diaphragm 12.

In some embodiments, the diaphragm further includes a connection part 122, and the connection part 122 connects the diaphragm inner part 121 and the diaphragm outer part 123. The stiffness of the connection part 122 is smaller than the stiffness of the diaphragm inner part 121. The connection part 122 is provided between the diaphragm outer part 123 and the diaphragm inner part 121, and the connection part 122 can be formed along the circumference of the diaphragm 12. The rigidity of the connection part 122 is smaller than the rigidity of the diaphragm inner part 121, so that the rigidity of the diaphragm 12 is reduced, therefore, the diaphragm 12 can release stress by means of deformation, thereby improving the sensitivity of the microphone.

As shown in FIG. 2, in some embodiments, the connection part 122 is an elastic part. When the diaphragm inner part 121 works, the diaphragm inner part 121 can stretch the elastic part against the elastic force of the elastic part; and when the diaphragm inner part 121 does not work, the elastic part can return to an initial position by its own elastic force.

The elastic part can be a spring, including an end connected to an outer edge of the diaphragm inner part 121, and another end connected to an inner edge of the diaphragm outer part 123. Due to the elasticity/stretchability of the spring, the vibration displacement of the diaphragm inner part 121 can be increased, thereby increasing the mechanical sensitivity of the diaphragm 12, so that a wider range of sound signals can be sensed.

As shown in FIG. 3, in some embodiments, the connection part 122 is a plurality of folds stacked in sequence. When the diaphragm inner part 121 works, the diaphragm inner part 121 can drive the plurality of stacked folds to unfold; and when the diaphragm inner part 121 does not work, the plurality of folds can return to the stacked state.

The folds can be integrated with the diaphragm inner part 121 and the diaphragm outer part 123. The parts between the diaphragm inner part 121 and the diaphragm outer part 123 are stacked to form the folds, and the folds can return to the initial state after being stretched and released. Due to the stretchability of the folds, the vibration displacement of the diaphragm inner part 121 can be increased, thereby increasing the mechanical sensitivity of the diaphragm 12, so that a wider range of sound signals can be sensed.

The connection part 122, the diaphragm inner part 121 and the diaphragm outer part 123 can be formed into one piece, so that the connection part 122 has the same material as the diaphragm inner part 121 and the diaphragm outer part 123, which is convenient for production. The diaphragm 12 may be made of a single material, or multiple materials, such as single crystal silicon, silicon nitride, silicon oxide, polysilicon, polyimide, or any combination thereof.

In the present invention, by providing the connection part 122 and the limiting member 13, the diaphragm 12 has high mechanical sensitivity, meanwhile, a risk of damage of the diaphragm 12 due to excessive amplitude under a large loud pressure can be reduced.

The above description merely illustrates some embodiments of the present invention. It should be noted that for those of ordinary skill in the art, improvements or modifications can be made without departing from an inventive concept of the present invention, but all these improvements and modification shall fall within a scope of the present invention.

What is claimed is:

1. A microphone chip, comprising:

a base comprising an inner cavity;

a diaphragm, wherein at least a portion of the diaphragm is supported on the base, and at least a portion of the diaphragm is arranged to be opposite to the inner cavity; and a limiting member supported on the base and located at two opposite sides of the diaphragm along a vibration direction of the diaphragm, wherein limiting member is spaced apart from the diaphragm, and the limiting member is configured to limit an amplitude of the diaphragm;

the limiting member comprises a first limiting part and a second limiting part that are located at the two opposite sides of the diaphragm along the vibration direction;

wherein the first limiting part and the second limiting part each extend along a direction perpendicular to the vibration direction of the diaphragm, and projections of the first limiting part and the second limiting part along the vibration direction of the diaphragm are located at least partially in the inner cavity; and wherein along the vibration direction of the diaphragm, at least a portion of the diaphragm that is arranged to be opposite to the inner cavity is located between the first limiting part and the second limiting part.

2. The microphone chip as described in claim 1, wherein the diaphragm comprises a diaphragm inner part and a diaphragm outer part that are connected to the diaphragm inner part, the diaphragm inner part and the diaphragm outer part are separated parts or formed into one piece, the diaphragm is supported on the base by means of the diaphragm outer part, the diaphragm inner part is arranged to be opposite to the inner cavity, and at least a portion of the diaphragm inner part is located between the first limiting part and the second limiting part.

3. The microphone chip as described in claim 2, wherein the projections of the first limiting part and the second limiting part towards the diaphragm inner part along the vibration direction of the diaphragm cover only an edge portion of the diaphragm inner part.

4. The microphone chip as described in claim 3, wherein during the vibration of the diaphragm, the diaphragm inner part abuts against an edge of the first limiting part and an edge of the second limiting part that are adjacent to the inner cavity, to limit the amplitude of the diaphragm.

5. The microphone chip as described in claim 2, further comprising a fixing member supported on the base and connected between the first limiting part and the second limiting part, wherein the fixing member connects an edge of the first limiting part and an edge of the second limiting part that are away from the diaphragm inner part, and at least a portion of the diaphragm outer part is fixed to the fixing member.

6. The microphone chip as described in claim 5, wherein the fixing member comprises a first fixing part and a second fixing part that are stacked along the vibration direction of the diaphragm, and the diaphragm outer part is at least partially sandwiched between the first fixing part and the second fixing part.

7. The microphone chip as described in claim 5, wherein rigidity of the diaphragm inner part is greater than rigidity of the diaphragm outer part, the diaphragm outer part is fixed to the fixing member only at an edge away from the diaphragm inner part, and the diaphragm is supported on the base only by means of the diaphragm outer part.

8. The microphone chip as described in claim 2, wherein the diaphragm further comprises a connection part, and the connection part connects the diaphragm inner part and the diaphragm outer part; and wherein stiffness of the connection part is smaller than stiffness of the diaphragm inner part.

9. The microphone chip as described in claim 8, wherein the connection part is an elastic part, or the connection part is a plurality of folds stacked in sequence.

* * * * *